US010061916B1

(12) United States Patent
Jiang et al.

(10) Patent No.: US 10,061,916 B1
(45) Date of Patent: Aug. 28, 2018

(54) SYSTEMS AND METHODS FOR MEASURING PEER INFLUENCE ON A CHILD

(71) Applicant: Symantec Corporation, Mountain View, CA (US)

(72) Inventors: Kevin Jiang, San Mateo, CA (US); Keith Newstadt, Newton, MA (US); Lei Gu, Bedford, MA (US)

(73) Assignee: Symantec Corporation, Mountain View, CA (US)

( * ) Notice: Subject to any disclaimer, the term of this patent is extended or adjusted under 35 U.S.C. 154(b) by 113 days.

(21) Appl. No.: 15/346,754

(22) Filed: Nov. 9, 2016

(51) Int. Cl.
*G06F 21/50* (2013.01)
*H04L 29/06* (2006.01)
*G06F 21/55* (2013.01)

(52) U.S. Cl.
CPC ............ *G06F 21/50* (2013.01); *G06F 21/554* (2013.01); *H04L 63/308* (2013.01)

(58) Field of Classification Search
CPC ....... H04L 63/308; G06F 21/50; G06F 21/554
See application file for complete search history.

(56) References Cited

U.S. PATENT DOCUMENTS

| | | | | |
|---|---|---|---|---|
| 7,827,247 B1 * | 11/2010 | Spertus | ................. | G06F 21/554 709/203 |
| 8,170,978 B1 * | 5/2012 | Newstadt | ............... | G06Q 10/10 706/45 |
| 8,434,126 B1 * | 4/2013 | Schepis | ............ | H04N 21/44222 726/1 |
| 8,504,671 B1 * | 8/2013 | Schepis | ................. | G06F 21/552 709/223 |
| 2008/0187893 A1 * | 8/2008 | Blaustein | ................. | G09B 7/02 434/236 |
| 2009/0144824 A1 * | 6/2009 | Rinek | ...................... | G09B 7/00 726/22 |
| 2009/0183226 A1 * | 7/2009 | Dean | ...................... | G06F 21/62 726/1 |

(Continued)

OTHER PUBLICATIONS

Verlinden et al., "Detecting Bullying in Early Elementary School With a Computerized Peer-Nomination Instrument", Psychological Assessment 2014, vol. 26, No. 2, 628-641, Published 2014 (Year: 2014).*

(Continued)

*Primary Examiner* — Chau Le
(74) *Attorney, Agent, or Firm* — FisherBroyles, LLP

(57) ABSTRACT

The disclosed computer-implemented method for measuring peer influence on a child may include (i) monitoring computing activity on at least one endpoint device of a child to identify (a) baseline behaviors that indicate expected behavior patterns of the child (b) an unusual behavior of the child that indicates a deviation from the baseline behaviors, (ii) identifying, based at least in part on the monitored computing activity, a peer of the child associated with the unusual behavior, (iii) determining, based at least in part on a comparison between the baseline behaviors and the unusual behavior, a level of influence the peer has on the child, and then (iv) performing a computing security action that prevents the child from engaging in potentially harmful behaviors by providing, to a guardian of the child, the level of influence of the peer. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2010/0099444 | A1* | 4/2010 | Coulter | G06F 17/2785 |
| | | | | 455/466 |
| 2013/0040629 | A1* | 2/2013 | Sprigg | H04W 4/50 |
| | | | | 455/419 |
| 2013/0219517 | A1* | 8/2013 | Yerli | H04L 63/10 |
| | | | | 726/28 |
| 2015/0205962 | A1* | 7/2015 | Swidowski | G06F 21/566 |
| | | | | 726/23 |
| 2016/0127379 | A1* | 5/2016 | Nayshtut | G06F 21/554 |
| | | | | 726/1 |

OTHER PUBLICATIONS

Cantone et al., "Interventions on Bullying and Cyberbullying in Schools: A Systematic Review", Clinical Practice and Epidemiology in Mental Health, 2015, 11, (Suppl 1: M4) 58-76, Published 2015 (Year: 2015).*

Multilateration; https://en.wikipedia.org/wiki/Multilateration, as accessed Nov. 7, 2016; Jun. 3, 2006.

* cited by examiner

SYSTEMS AND METHODS FOR MEASURING PEER INFLUENCE ON A CHILD

BACKGROUND

Parents and other guardians often wish to prevent children under their care from engaging in inappropriate or risky behaviors. For example, a parent may wish to ensure that their child does not view unsuitable media content, visit dangerous neighborhoods, or forgo productive activities such as studying for diversions such as watching television or playing video games. Accordingly, the parent may implement a parental control system on a computing device of the child to track and/or limit certain online or other computing behaviors of the child.

Conventional parental control systems may allow parents to impose restrictions on a child's computing behavior, such as preventing the child from visiting inappropriate websites or sending text messages during school hours. Unfortunately, these traditional technologies may be unable to provide guardians with a robust, comprehensive assessment of a child's behavior, much less identify significant changes in the child's behavior. The instant disclosure, therefore, identifies and addresses a need for improved parental control systems.

SUMMARY

As will be described in greater detail below, the instant disclosure describes various systems and methods for measuring peer influence on a child. In one example, a method for measuring peer influence on a child may include (i) monitoring computing activity on at least one endpoint device of the child to identify (a) baseline behaviors that indicate expected behavior patterns of the child (b) an unusual behavior of the child that indicates a deviation from the baseline behaviors, (ii) identifying, based at least in part on the monitored computing activity, a peer of the child associated with the unusual behavior, (iii) determining, based at least in part on a comparison between the baseline behaviors and the unusual behavior, a level of influence the peer has on the child, and then (iv) performing a computing security action that prevents the child from engaging in potentially harmful behaviors by providing, to a guardian of the child, the level of influence of the peer.

In some examples, monitoring the computing activity on the endpoint device of the child may include monitoring online resources the child accesses via the endpoint device. In other examples, monitoring the computing activity may include monitoring communications distributed via the endpoint device. Additionally or alternatively, monitoring the computing activity may include monitoring geographic locations visited by the child based on a geolocation service of the endpoint device.

In some embodiments, monitoring the computing activity on the endpoint device of the child may include monitoring computing activity on multiple endpoint devices of the child. In such embodiments, identifying the peer of the child may include analyzing concurrent computing activities detected on the multiple endpoint devices.

In some embodiments, identifying the baseline behaviors of the child may include identifying behaviors of the child that are associated with multiple peers. Additionally or alternatively, identifying the baseline behaviors may include (i) recording computing activity detected on the endpoint device for a predetermined amount of time and then (ii) identifying recurring behaviors of the child based on the recorded computing activity.

In some examples, identifying the unusual behavior of the child may include detecting a behavior associated with a particular peer rather than multiple peers. Additionally or alternatively, identifying the unusual behavior may include detecting a novel behavior not identified within the baseline behaviors and/or detecting a change in a frequency of a baseline behavior.

In some embodiments, identifying the peer of the child associated with the unusual behavior may include identifying an individual located within a same geographic location as the child while the child performs the unusual behavior. In other embodiments, identifying the peer of the child may include identifying an individual that is not located within a same geographic location as the child but that is in communication with the child while the child performs the unusual behavior.

In some examples, determining the level of influence the peer has on the child may include quantifying a degree to which the unusual behavior deviates from the baseline behaviors of the child. Additionally or alternatively, determining the level of influence the peer has on the child may include determining whether the peer has a positive influence or a negative influence on the child.

In some embodiments, providing the level of influence of the peer to the guardian of the child may include displaying the level of influence of the peer within a graphical user interface (GUI) of an endpoint device of the guardian. Furthermore, in some examples, performing the computing security action may include preventing the endpoint device of the child from facilitating the unusual behavior.

In one embodiment, a system for measuring peer influence on a child may include several modules stored in memory, including (i) a monitoring module that monitors computing activity on at least one endpoint device of the child to identify (a) baseline behaviors that indicate expected behavior patterns of the child (b) an unusual behavior of the child that indicates a deviation from the baseline behaviors, (ii) an identification module that identifies, based at least in part on the monitored computing activity, a peer of the child associated with the unusual behavior, (iii) a determination module that determines, based at least in part on a comparison between the baseline behaviors and the unusual behavior, a level of influence the peer has on the child, and (iv) a security module that performs a computing security action that prevents the child from engaging in potentially harmful behaviors by providing, to a guardian of the child, the level of influence of the peer. In addition, the system may include at least one physical processor configured to execute the monitoring module, the identification module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) monitor computing activity on at least one endpoint device of a child to identify (a) baseline behaviors that indicate expected behavior patterns of the child (b) an unusual behavior of the child that indicates a deviation from the baseline behaviors, (ii) identify, based at least in part on the monitored computing activity, a peer of the child associated with the unusual behavior, (iii) determine, based at least in part on a comparison between the baseline behaviors and the unusual behavior, a level of influence the peer has on the child, and then (iv) perform a computing security action that prevents the child from engaging in potentially harmful behaviors by providing, to a guardian of the child, the level of influence of the peer.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
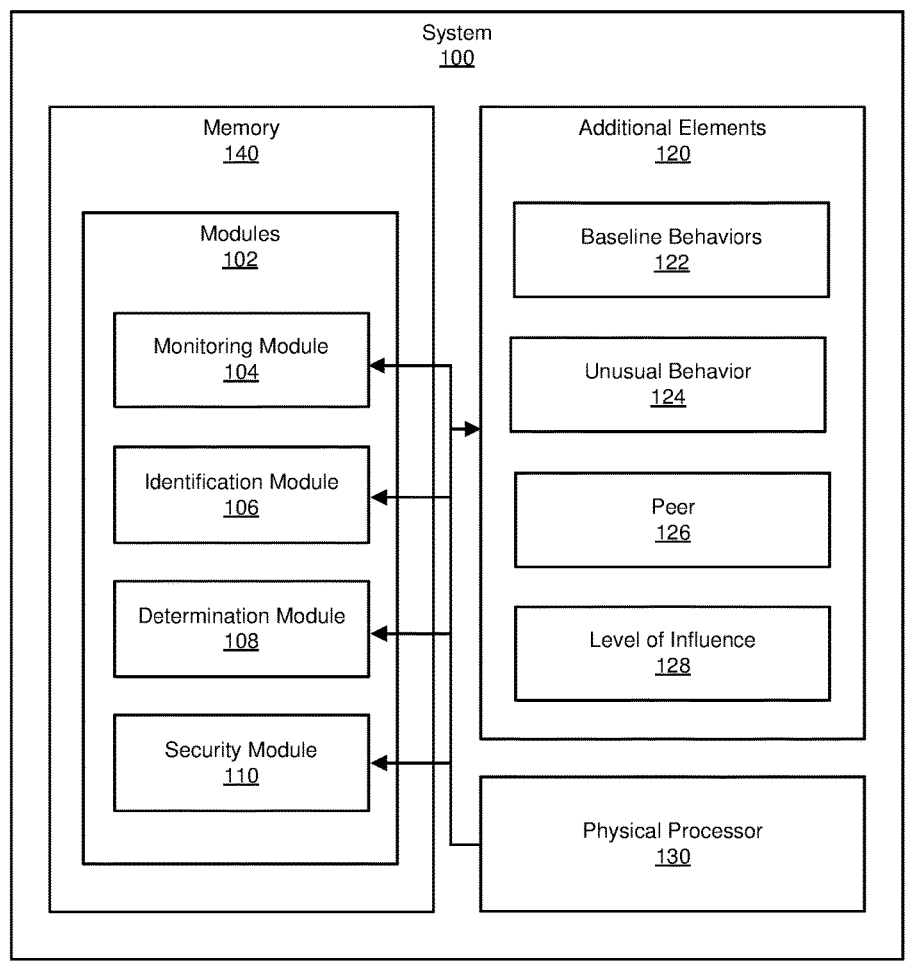
FIG. 1 is a block diagram of an example system for measuring peer influence on a child.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for measuring peer influence on a child. As will be explained in greater detail below, by monitoring computing activity on one or more endpoint devices of a child, the systems and methods described herein may identify baseline behaviors that indicate normal, expected patterns of behavior for the child. The disclosed systems and methods may then detect when a child is performing an unusual and/or unexpected behavior that is likely the result of and/or associated with the child's relationship with a particular peer. As such, the systems and methods described herein may determine a level of influence the peer has on the child (whether positive or negative), and report the level of influence to a guardian of the child so that the guardian may appropriately limit or direct the child's relationship with the peer.

In addition, the systems and methods described herein may improve the functioning of a computing device by preventing a child from performing harmful behaviors via the computing device that the child may be influenced to perform by a peer. In particular, the disclosed systems and methods may prevent a child from engaging in behaviors that compromise the security of a computing device. These systems and methods may also improve the field of parental control systems by quantifying levels of influence peers have on a child based on computing activities of the child.

Figure 2:
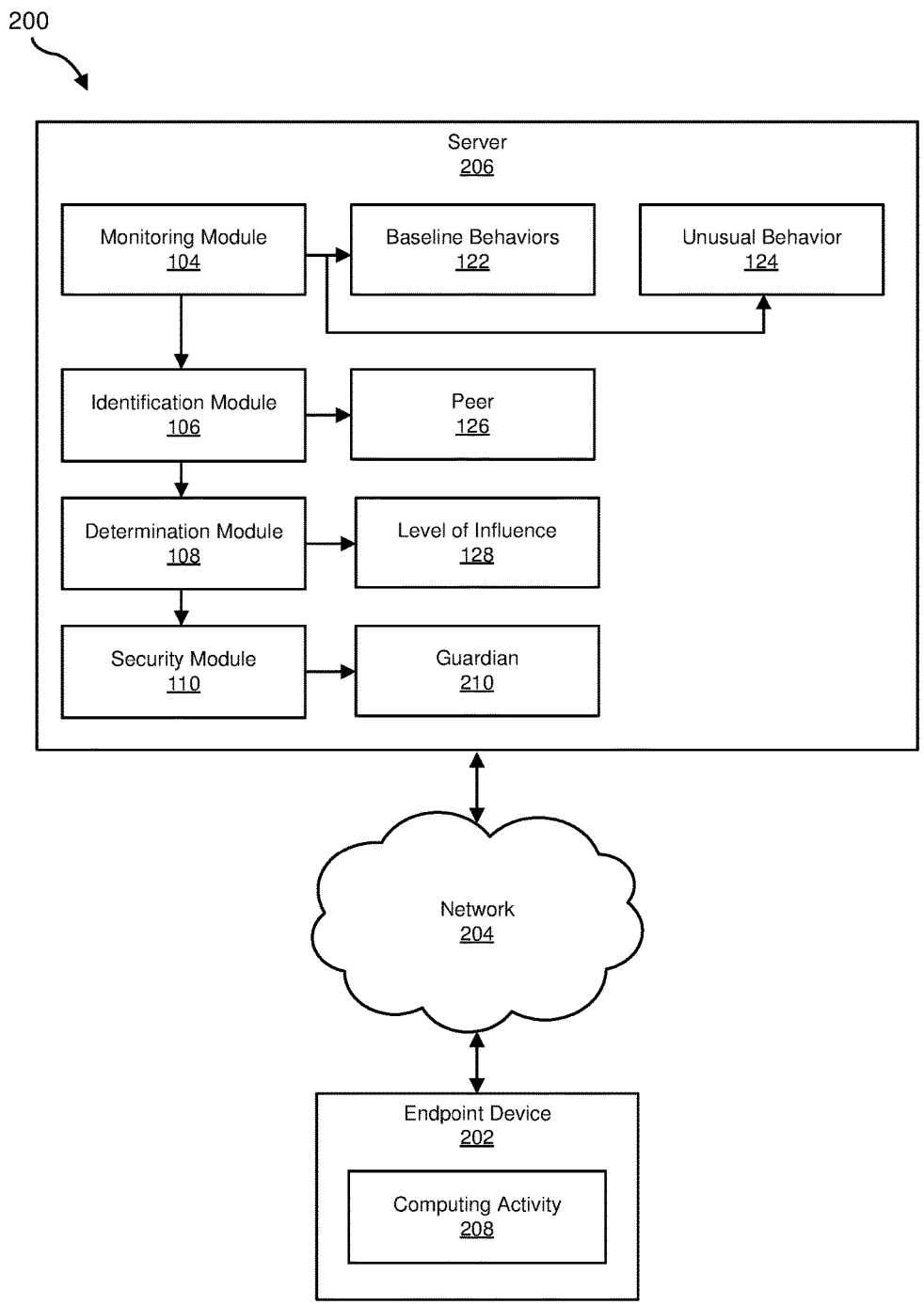
FIG. 2 is a block diagram of an additional example system for measuring peer influence on a child.

The following will provide, with reference to FIGS. 1 and 2, detailed descriptions of example systems for measuring peer influence on a child. Detailed descriptions of corresponding computer-implemented methods will also be provided in connection with FIG. 3. Detailed descriptions of example GUIs that display levels of influence that peers of a child have on the child will be provided in connection with FIG. 4. In addition, detailed descriptions of an example computing system and network architecture capable of implementing one or more of the embodiments described herein will be provided in connection with FIGS. 5 and 6, respectively.

FIG. 1 is a block diagram of an example system 100 for measuring peer influence on a child. As illustrated in this figure, example system 100 may include one or more modules 102 for performing one or more tasks. As will be explained in greater detail below, example system 100 may include a monitoring module 104 that monitors computing activity on at least one endpoint device of a child to identify (i) baseline behaviors that indicate expected behavior patterns of the child and (ii) an unusual behavior of the child that indicates a deviation from the baseline behaviors. In addition, example system 100 may include an identification module 106 that identifies, based at least in part on the monitored computing activity, a peer of the child associated with the unusual behavior.

As will be explained in greater detail below, example system 100 may include a determination module 108 that determines, based at least in part on a comparison between the baseline behaviors and the unusual behavior, a level of influence the peer has on the child. Finally, example system 100 may include a security module 110 that performs a computing security action that prevents the child from engaging in potentially harmful behaviors by providing, to a guardian of the child, the level of influence of the peer. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., endpoint device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate measuring peer influence on a child. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120. In one example, additional elements 120 may include baseline behaviors 122, which generally represent any type or form of activities (e.g., computing, online, or physical activities) known to be or expected to be performed by a child. In some embodiments, additional elements 120 may also include an unusual behavior 124. Unusual behavior 124 generally represents any type or form of activity that a child is not known to or expected to perform. Furthermore, additional elements 120 may include a peer 126. Peer 126 generally represents any individual or group of individuals associated with a child that potentially influence the child to perform one or more behaviors. Finally, as shown in FIG. 1, additional elements 120 may include a level of influence 128. Level of influence 128 generally represents any quantification or calculation that measures a degree of impact that a peer has on a child (e.g., with respect to one or more behaviors).

Example system 100 in FIG. 1 may be implemented in a variety of ways. For example, all or a portion of example system 100 may represent portions of example system 200 in FIG. 2. As shown in FIG. 2, system 200 may include an endpoint device 202 in communication with a server 206 via a network 204. In one example, all or a portion of the functionality of modules 102 may be performed by endpoint device 202, server 206, and/or any other suitable computing system. As will be described in greater detail below, one or more of modules 102 from FIG. 1 may, when executed by at least one processor of endpoint device 202 and/or server 206, enable endpoint device 202 and/or server 206 to measure peer influence on a child.

For example, and as will be described in greater detail below, monitoring module 104 may cause server 206 to monitor computing activity 208 on endpoint device 202 to identify (i) baseline behaviors 122 of a child that uses endpoint device 202 and (ii) unusual behavior 124 of the child. In addition, identification module 106 may cause server 206 to identify, based at least in part on computing activity 208, peer 126 that is associated with unusual behavior 124. Next, determination module 108 may cause server 206 to determine, based at least in part on a comparison between baseline behaviors 122 and unusual behavior 124, level of influence 128 that peer 126 has on the child. Finally, security module 110 may cause server 206 to perform a computing security action that prevents the child from engaging in potentially harmful behaviors by providing level of influence 128 to a guardian 210 of the child.

Endpoint device 202 generally represents any type or form of computing device capable of reading computer-executable instructions. In some examples, endpoint device 202 may represent an endpoint device managed or used by a child whose behavior a guardian wishes to limit or monitor. In these examples, endpoint device 202 may run client-side parental control software. Furthermore, although FIG. 2 illustrates a single endpoint device 202, the disclosed systems may monitor multiple endpoint devices of a child (e.g., by installing an instance of a parental control software agent on each endpoint device). Examples of endpoint device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of monitoring, analyzing, and detecting behavior patterns and unusual behaviors of a child. In some examples, server 206 may represent a back-end security server or parental control server that analyzes computing activity detected on one or more endpoint devices. Examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between endpoint device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
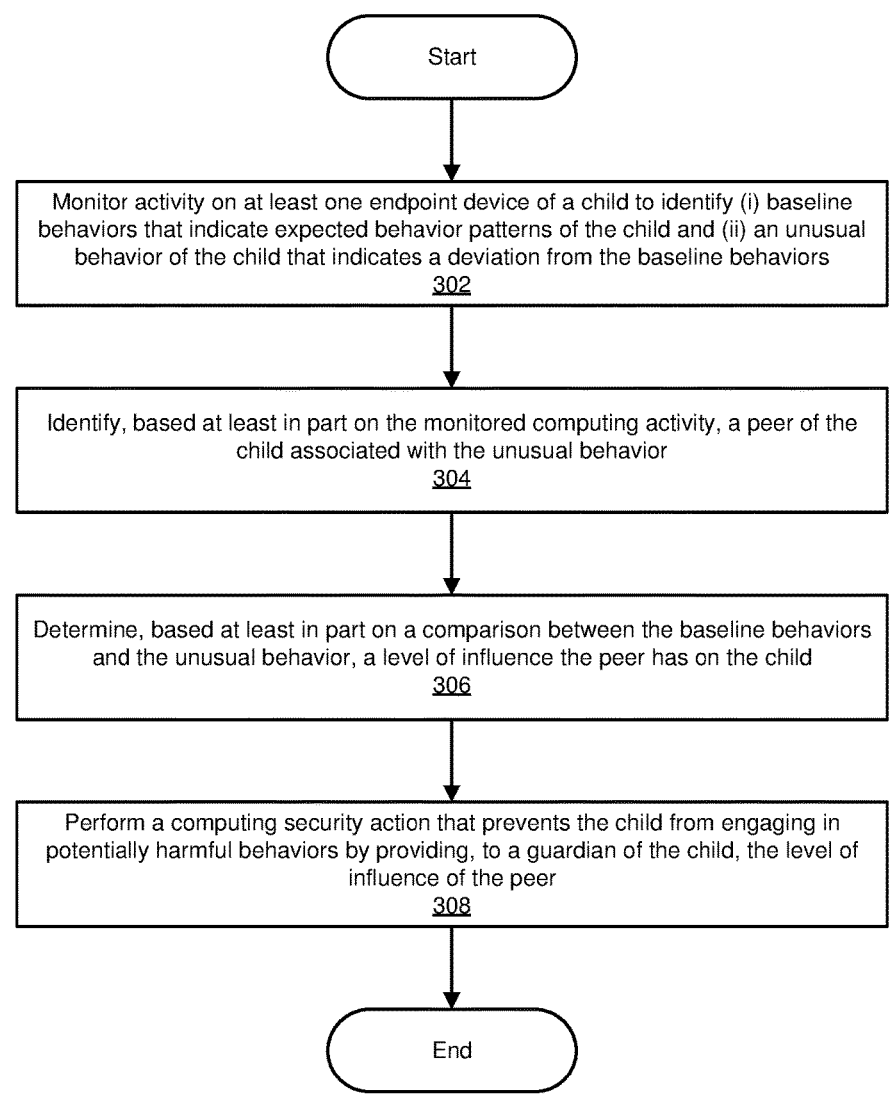
FIG. 3 is a flow diagram of an example method for measuring peer influence on a child.

FIG. 3 is a flow diagram of an example computer-implemented method 300 for measuring peer influence on a child. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may monitor computing activity on at least one endpoint device of a child to identify (i) baseline behaviors that indicate expected behavior patterns of the child and (ii) an unusual behavior of the child that indicates a deviation from the baseline behaviors. For example, monitoring module 104 may, as part of server 206 in FIG. 2, monitor computing activity 208 on endpoint device 202 to identify baseline behaviors 122 and unusual behavior 124.

The term "computing activity," as used herein, generally refers to any type or form of behavior or action performed on or via a computing device. In general, a computing activity may involve any input or interaction between a computing device, an application, a network, and/or a user. As will be explained below, a computing activity on an endpoint device may indicate or describe a behavior of a user of the endpoint device.

The systems described herein may monitor computing activity on an endpoint device of a child in a variety of ways. In some examples, a guardian of a child may identify, to monitoring module 104, one or more endpoint devices of the child on which to monitor computing activity. For example, the guardian may initiate installing an instance of monitoring module 104 onto the child's laptop, tablet, cellular phone, or other endpoint device. Additionally or alternatively, the guardian may direct monitoring module 104 to monitor computing activity on the child's endpoint device via a separate device, such as via a router, modem, or other network device that connects the endpoint device to a network.

Monitoring module 104 may identify, track, and record a variety of computing activities on a child's endpoint device. In some examples, monitoring module 104 may monitor all or a portion of the online resources that a child accesses via an endpoint device. The term "online resource," as used herein, generally refers to any type or form of content or destination accessible via a network. Examples of online resources include, without limitation, websites, domains, cloud-based applications, and online media (e.g., videos, music, and games). Monitoring module 104 may monitor online resources accessed via an endpoint device using a variety of monitoring techniques, such as by analyzing network packets distributed to and from the endpoint device, identifying Domain Name System (DNS) servers accessed by the endpoint device, and/or analyzing content presented on user interfaces of web browsers running on the endpoint device.

Additionally or alternatively, monitoring module 104 may monitor computing activity on an endpoint device by monitoring communications distributed via the endpoint device. For example, monitoring module 104 may intercept and analyze Short Media Message (SMS) messages, Multimedia Messaging Service (MMS) messages, messages sent via social media platforms (e.g., SNAPCHAT, FACEBOOK, and GCHAT), emails, phone calls, and/or any additional type of electronic message distributed or received by an endpoint device. In some embodiments, monitoring module 104 may identify content within the messages (e.g., keywords, links, etc.), as well as an individual or entity the messages are directed to or from. Monitoring module 104 may monitor electronic communications of a child in a variety of ways, such as by directly analyzing data within communication applications and/or hooking system calls involved in distributing or receiving messages.

In further examples, monitoring module 104 may monitor computing activity on a child's endpoint device by identifying geographic locations visited by the child. For example, monitoring module 104 may utilize a geolocation service (e.g., a Global Positioning System (GPS)) provided by or running on an endpoint device to track physical locations (e.g., buildings, addresses, neighborhoods, etc.) to which a child brings the endpoint device. Monitoring module 104 may identify physical locations visited by a child using any additional or alternative location technique, such as techniques based on internet protocol (IP) address geolocation or radio navigation.

In some examples, monitoring module 104 may identify contextual details relevant to a detected computing activity. For example, monitoring module 104 may identify a location and/or time (e.g., time of day, day of the week) at which a child performed a detected computing activity. Additionally or alternatively, monitoring module 104 may identify one or more additional computing activities in which a child was engaged while performing a detected activity. For example, monitoring module 104 may determine that a child is participating in a phone call while playing a video game. Notably, in some embodiments, identifying simultaneous behaviors of a child may involve monitoring activity on multiple devices associated with the child. For example, monitoring module 104 may concurrently monitor and record activities on a child's cell phone, laptop, tablet, television, and/or gaming system.

In some embodiments, monitoring module 104 may record and accumulate multiple computing activities of a child. Monitoring module 104 may then identify a set of baseline behaviors exhibited by the child based on the accumulated computing activity. In some examples, monitoring module 104 may determine that a behavior the child repeatedly and/or periodically exhibits is a baseline behavior. As an example, monitoring module 104 may determine that watching a particular television show is a baseline behavior of a child after determining that the child watches episodes of the show more than twice a week. In other examples, monitoring module 104 may determine that a behavior a child performs with (or while in communication with) various peers is a baseline behavior. For example, monitoring module 104 may determine that a behavior frequently exhibited by a child in various circumstances is likely not associated with a particular peer, and is therefore a baseline behavior. Similarly, monitoring module 104 may determine that a behavior performed by the child while the child is not in the presence of nor in communication with any peer is a baseline behavior.

In some examples, monitoring module 104 may determine baseline behaviors of a child based on accumulating computing activity of the child for a predetermined amount of time (e.g., a day, a week, a month, etc.). In other examples, monitoring module 104 may continuously or periodically accumulate computing activity of a child and adjust the child's baseline behaviors as necessary.

In some embodiments, monitoring module 104 may detect a computing activity on an endpoint device of the child that indicates an unusual or unexpected behavior of the child. For example, monitoring module 104 may detect an unusual behavior of a child by identifying a computing activity that indicates a behavior likely associated with a particular peer (e.g., a behavior that is performed while the child is in communication with a particular peer, rather than at various times with different peers). Additionally or alternatively, monitoring module 104 may detect an unusual behavior of a child by identifying a computing activity that indicates an alteration and/or addition to the child's baseline behaviors. For example, monitoring module 104 may detect a novel (e.g., not yet identified) computing activity on the child's endpoint device. In addition, monitoring module 104 may identify an unusual behavior of a child based on detecting a change in a frequency of a recurring (e.g., previously-identified) behavior of the child.

In some examples, monitoring module 104 may identify unusual behaviors that indicate negative or potentially harmful behaviors. For example, monitoring module 104 may focus on detecting unusual behaviors such as viewing inappropriate media content, visiting dangerous locations, and/or not attending scheduled appointments. However, in other examples, monitoring module 104 may record any and/or all unusual behaviors of a child to enable the disclosed systems to identify peers with both positive and negative influences on the child.

Returning to FIG. 3, at step 304 one or more of the systems described herein may identify, based at least in part on the monitored computing activity, a peer of the child associated with the unusual behavior. For example, identification module 106 may, as part of server 206 in FIG. 2, identify peer 126 based at least in part on computing activity 208.

The term "peer," as used herein, generally refers to any type or form of individual (or group of individuals) associated with or in communication with a child whose computing activity is monitored by the disclosed systems. Examples of peers include, without limitation, friends of a child, classmates of a child, teammates of a child, and/or siblings or other relatives of a child.

The systems described herein may identify a peer of a child associated with a behavior of the child in a variety of ways. In some examples, identification module 106 may identify a peer associated with a behavior of a child by analyzing computing activity that directly indicated the behavior. For example, in the event that monitoring module 104 detects a behavior involving an electronic message, identification module 106 may identify a peer associated with the behavior by identifying the recipient or distributor of the message.

In other examples, identification module 106 may analyze contextual information about a behavior to identify a peer associated with the behavior. For example, identification module 106 may identify a peer by analyzing computing activity that is related to but separate from a detected behavior. In particular, identification module 106 may analyze computing activities that occurred simultaneously on different endpoint devices of a child. In this way, identification module 106 may identify a peer that is not physically located within a same geographic location as a child performing a behavior but that is in communication with or otherwise influencing the child. As an example, monitoring module 104 may determine that a child is browsing a website with inappropriate content. In this example, identification module 106 may identify a peer associated with the child's decision to browse the website by identifying an individual in communication with the child (e.g., via a cellular phone or instant messaging application) while browsing the website.

In additional examples, identification module 106 may identify a peer of a child that is physically located near the child while the child performs a behavior. In one embodiment, identification module 106 may identify a peer based on received input (e.g., from a guardian of the child) that indicates a peer that is known to be within the same physical location as the child at a certain point in time. For example, the parental control systems disclosed herein may enable a guardian to indicate activities of a child and/or peers involved in the activities. Additionally or alternatively, identification module 106 may identify a peer of a child that is physically located near the child by analyzing and/or discovering an endpoint device of one or more individuals within a certain degree of proximity to the child. For example, identification module 106 identify a peer of a child by intercepting and analyzing wireless communications distributed near an endpoint device of the child.

Notably, the systems described herein may perform steps 302 and 304 either separately or concurrently. For example, as an analysis of a peer associated with a behavior may indicate in part whether the behavior is a baseline behavior or an unusual behavior (as described above), identification module 106 may identify peers associated with behaviors at any point while or after monitoring module 104 monitors computing activity on an endpoint device.

Returning to FIG. 3, at step 306 one or more of the systems described herein may determine, based at least in part on a comparison between the baseline behaviors and the unusual behavior, a level of influence the peer has on the child. For example, determination module 108 may, as part of server 206 in FIG. 2, determine level of influence 128 of peer 126 based at least in part on a comparison between baseline behaviors 122 and unusual behavior 124.

The term "level of influence," as used herein, generally refers to any type or form of quantification or calculation indicating a degree to which a peer affects or alters one or more behaviors of a child. In some examples, a level of influence may indicate whether a peer has a positive or negative influence on a child, as well as a specific area or type of behavior in which the peer exerts the influence. Additionally, in some embodiments, a level of influence may be represented as a number within any type or form of range or scale. The numerical value of a level of influence may be calculated using any metric, analysis, or formula and based on any one or combination of features of an unusual behavior and/or baseline behavior.

The systems described herein may determine a level of influence a peer has on a child in a variety of ways. In some examples, determination module 108 may determine a level of influence of a peer based on a degree of uniqueness or distinctiveness of a behavior associated with the peer. For example, determination module 108 may determine that a peer has a stronger influence on a child in the event that the child only performs a certain behavior in the presence of the peer than in the event that the child performs the certain behavior in the presence of multiple peers. Additionally or alternatively, determination module 108 may determine a level of influence of a peer based in part on a degree of novelty or unexpectedness of a behavior associated with the peer. For example, determination module 108 may determine that a peer associated with a previously-undetected behavior has a greater level of influence than a peer associated with an alteration in an existing behavior.

In further embodiments, determination module 108 may determine a level of influence of a peer based on potential consequences of an unusual behavior associated with the peer. For example, determination module 108 may determine that a peer associated with a highly dangerous behavior has a greater level of influence than a peer associated with a less dangerous behavior. In another example, determination module 108 may determine a level of influence of a peer based in part on a frequency or number of times a child performs an unusual behavior associated with the peer. For example, determination module 108 may determine that a peer associated with an unusual behavior a child has performed three times in the last week has a greater level of influence than a peer associated with an unusual behavior the child has performed twice in the last month.

Furthermore, in some embodiments, determination module 108 may determine a level of influence a peer has regarding a specific type or subset of behaviors of a child (in addition to or instead of determining an overall level of influence of the peer). For example, determination module 108 may determine that a peer has a different level of influence in one area (e.g., eating at fast food restaurants) than another area (e.g., completing homework assignments). In addition, in some examples, determination module 108 may determine whether a peer has a positive or negative influence on a child. For example, determination module 108 may determine that a peer has a positive influence in the event that the peer is associated with an increase in beneficial, healthy behaviors and/or associated with a decrease in harmful behaviors.

Returning to FIG. 3, at step 308 one or more of the systems described herein may perform a computing security action that prevents the child from engaging in potentially harmful behaviors by providing, to a guardian of the child, the level of influence of the peer. For example, security module 110 may, as part of server 206 in FIG. 2, perform a computing security action that prevents the child from engaging in potentially harmful behaviors by providing level of influence 128 of peer 126 to guardian 210.

The term "guardian," as used herein, generally refers to any individual with a degree of authority or supervision over another individual. Examples of guardians include, without limitation, parents, grandparents, older siblings, additional relatives, teachers, mentors, coaches, etc.

The systems described herein may provide a level of influence of a peer to a guardian in a variety of ways. In some examples, security module 110 may provide calculated levels of influence to a guardian via a portal or GUI accessible to the guardian. In particular, security module 110 may display such information on an endpoint device managed by the guardian and/or used by the guardian to manage the disclosed parental control systems.

Figure 4:
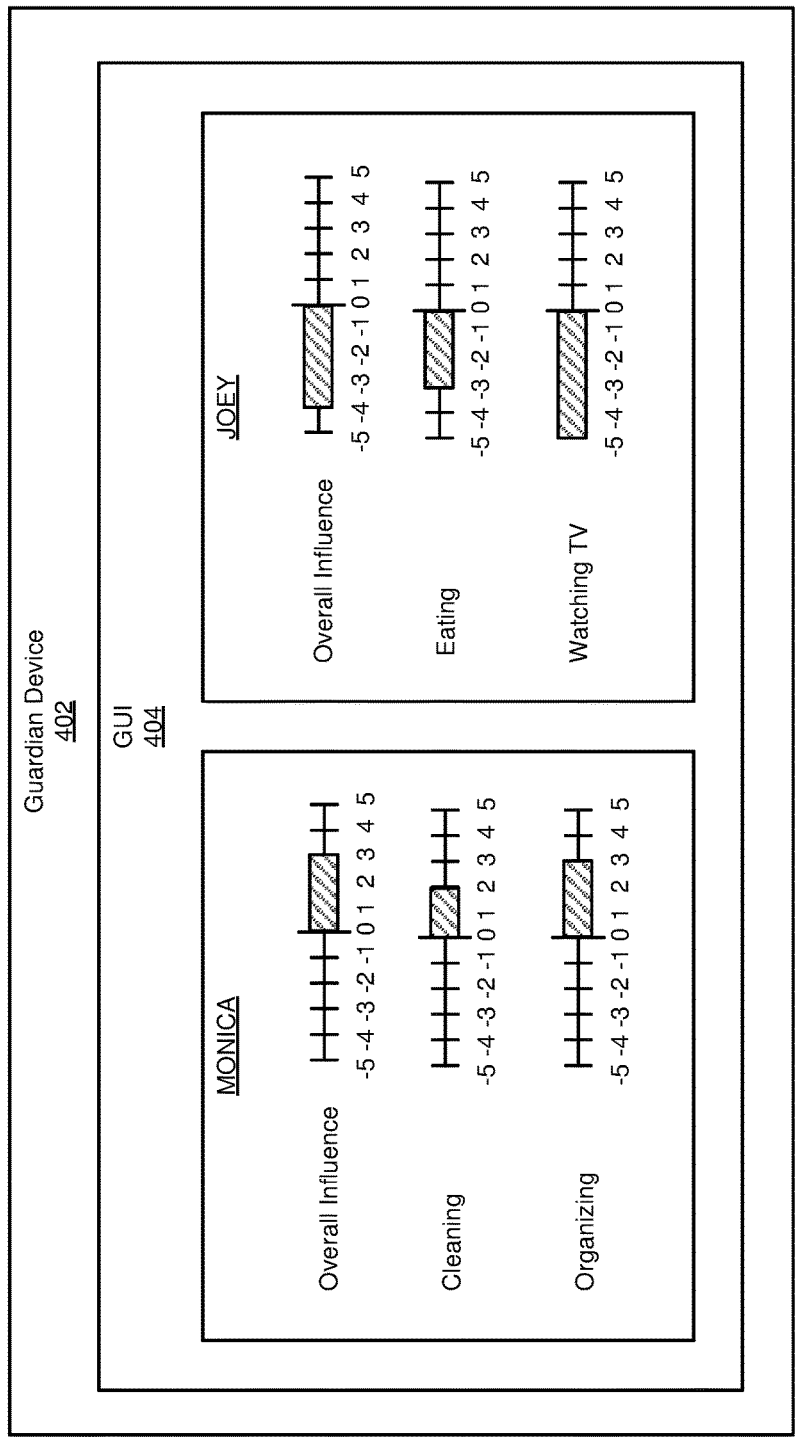
FIG. 4 is an illustration of an example GUI that displays levels of influence that peers of a child have on the child.

As an example of presenting levels of influence to a guardian, FIG. 4 illustrates a guardian device 402 displaying a GUI 404 provided by security module 110. As shown in FIG. 4, GUI 404 may display levels of influence associated with two peers (i.e., Monica and Joey). In this example, the disclosed systems may have determined an overall level of influence for each peer, as well as levels of influence the peers have in specific behavior areas. In addition, the disclosed systems may determine levels of influence as integers from −5 to 5, with −5 indicating a highly negative or detrimental level of influence and 5 indicating a highly positive or beneficial level of influence.

As shown in FIG. 4, GUI 404 may illustrate that Monica has an overall positive influence on a child (i.e., an overall influence level of 3). In addition, GUI 404 may indicate, to the child's guardian, that Monica has an influence level of 2 in behaviors related to cleaning and an influence level of 3 in behaviors related to organizing. In addition, GUI 404 may illustrate that Joey has an overall negative influence on the child (i.e., an overall influence level of −4), with an influence level of −3 in behaviors related to eating and an influence level of −5 in behaviors related to watching television. In this example, the disclosed systems may have determined the overall influence levels of each peer based on a combined analysis (e.g., average) of the peer's influence levels in specific behavior areas.

In some embodiments, security module 110 may perform one or more security actions based on the influence levels of peers presented to a guardian of a child. In one example, security module 110 may (automatically or in direction from a guardian) impose limitations on a child's computing behavior based on one or more unusual behaviors of the child and/or levels of influence of the child's peers. Specifically, security module 110 may block or restrict communications between the child and a peer with a negative influence level. For example, security module 110 may entirely block all communications in the event that the peer has a highly negative level of influence, or limit communications to a certain amount or time of day in the event that the peer has a slightly negative level of influence. In another example, security module 110 may prevent a child from viewing certain inappropriate content via one or more endpoint devices of the child based on a determination that a peer of the child is influencing the child to view the inappropriate content.

Furthermore, in some embodiments, security module 110 may display influence levels of peers to a guardian to enable the guardian to appropriately direct or limit behaviors of a child. For example, by indicating to a guardian whether a peer of a child has a positive or negative influence, security module 110 may enable the guardian to appropriately encourage or discourage the child's relationship with the peer.

As explained above in connection with FIG. 3, a parental control system may monitor computing activity on one or more endpoint devices of a child to identify baseline behaviors that indicate normal, expected behaviors of the child. The parental control system may then detect an unusual behavior of the child and determine that the unusual behavior is likely associated with and/or the result of interactions between the child and a particular peer. As such, the parental control system may quantify the peer's level of influence on the child. In particular, the parental control system may determine whether the peer is an overall good or bad influence on the child, or identify a certain behavior or activity in which the peer exerts particularly strong influence. The parental control system may provide this level of influence to a guardian of the child to enable the guardian to restrict computing activities of the child associated with the unusual behavior, or encourage the child to either foster or prohibit their relationship with the peer.

Figure 5:
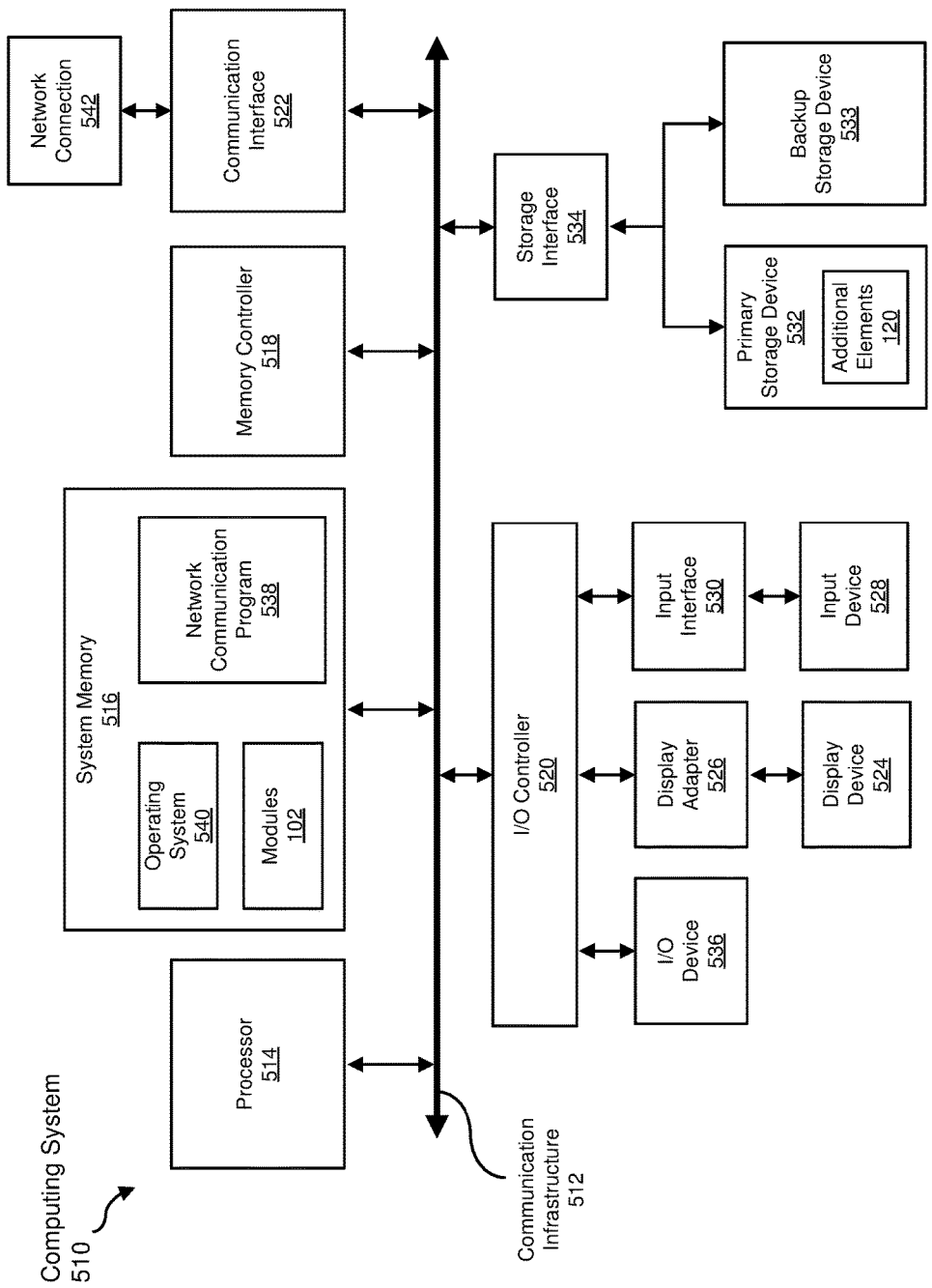
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, additional elements 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
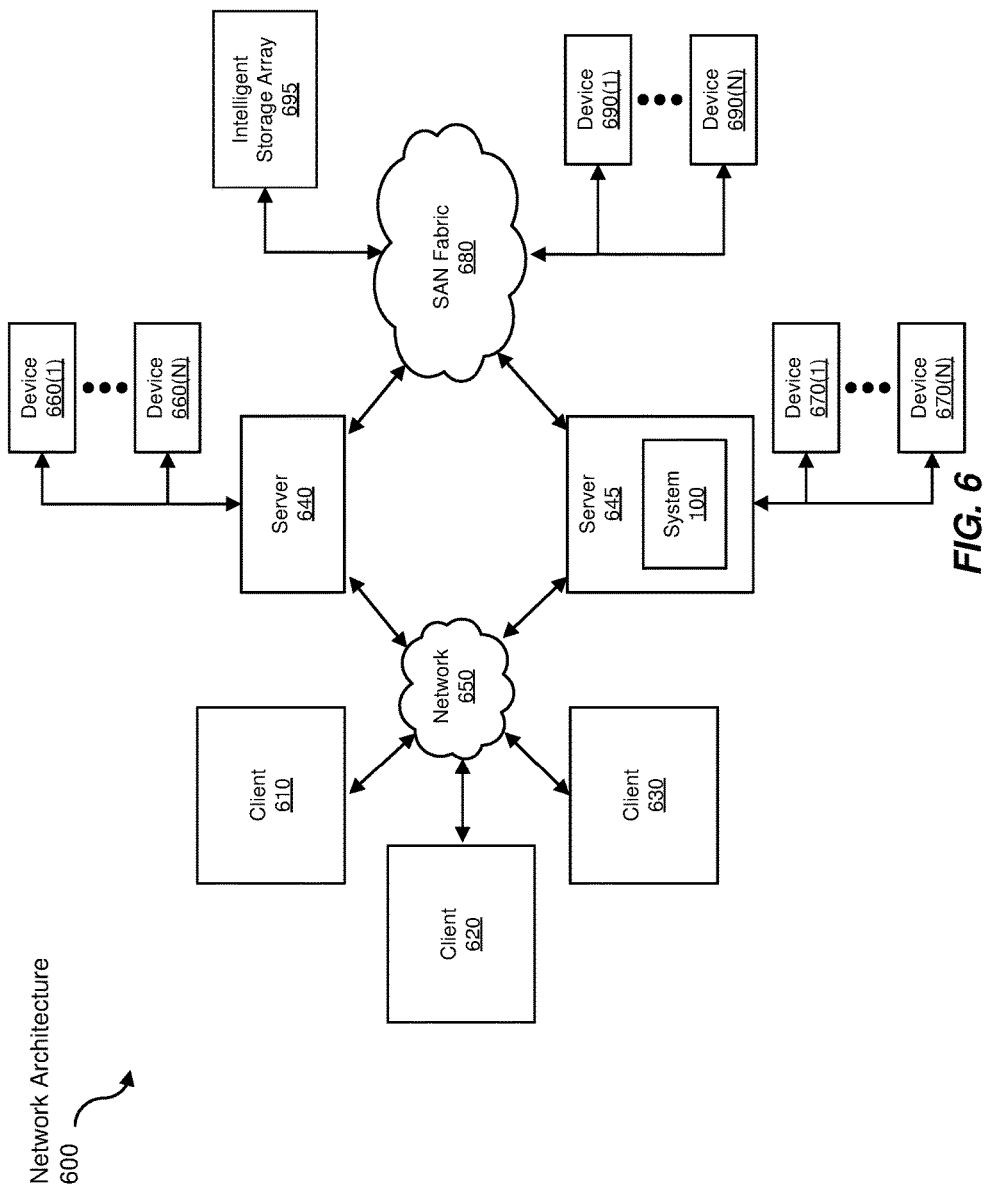
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for measuring peer influence on a child.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive computing activities of a child, transform the computing activities into a level of influence a peer has on the child, output a result of the transformation to a guardian of the child, use the result of the transformation to prevent the child engaging in harmful behaviors, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for measuring peer influence on a child, at least a portion of the method being performed by a computing device comprising at least one processor, the method comprising:
    monitoring computing activity on at least one endpoint device of the child to identify:
        baseline behaviors that indicate expected behavior patterns of the child; and
        an unusual behavior of the child that indicates a deviation from the baseline behaviors;
    identifying, based at least in part on the monitored computing activity, a peer of the child associated with the unusual behavior;
    determining, based at least in part on a comparison between the baseline behaviors and the unusual behavior, a level of influence the peer has on the child; and
    performing a computing security action that prevents the child from engaging in potentially harmful behaviors by providing, to a guardian of the child, the level of influence of the peer.

2. The method of claim 1, wherein:
    monitoring the computing activity on the endpoint device of the child comprises monitoring computing activity on multiple endpoint devices of the child; and
    identifying the peer of the child comprises analyzing concurrent computing activities detected on the multiple endpoint devices.

3. The method of claim 1, wherein monitoring the computing activity on the endpoint device of the child comprises at least one of:
    monitoring online resources the child accesses via the endpoint device;
    monitoring communications distributed via the endpoint device; and
    monitoring geographic locations visited by the child based on a geolocation service of the endpoint device.

4. The method of claim 1, wherein identifying the baseline behaviors of the child comprises at least one of:
    identifying behaviors of the child that are associated with multiple peers; and
    recording computing activity detected on the endpoint device for a predetermined amount of time and identifying recurring behaviors of the child based on the recorded computing activity.

5. The method of claim 1, wherein identifying the unusual behavior of the child comprises detecting at least one of:
    a behavior associated with a particular peer rather than multiple peers;
    a novel behavior of the child not identified within the baseline behaviors; and
    a change in a frequency of a baseline behavior of the child.

6. The method of claim 1, wherein identifying the peer of the child associated with the unusual behavior comprises identifying an individual located within a same geographic location as the child while the child performs the unusual behavior.

7. The method of claim 1, wherein identifying the peer of the child associated with the unusual behavior comprises identifying an individual that is not located within a same geographic location as the child but that is in communication with the child while the child performs the unusual behavior.

8. The method of claim 1, wherein determining the level of influence the peer has on the child comprises quantifying a degree to which the unusual behavior deviates from the baseline behaviors of the child.

9. The method of claim 1, wherein determining the level of influence the peer has on the child comprises determining whether the peer has a positive influence or a negative influence on the child.

10. The method of claim 1, wherein providing the level of influence of the peer to the guardian of the child comprises displaying the level of influence of the peer within a graphical user interface of an endpoint device of the guardian.

11. The method of claim 1, wherein performing the computing security action that prevents the child from engaging in potentially harmful behaviors further comprises preventing the endpoint device of the child from facilitating the unusual behavior.

12. A system for measuring peer influence on a child, the system comprising:
　a monitoring module, stored in memory, that monitors computing activity on at least one endpoint device of the child to identify:
　　baseline behaviors that indicate expected behavior patterns of the child; and
　　an unusual behavior of the child that indicates a deviation from the baseline behaviors;
　an identification module, stored in memory, that identifies, based at least in part on the monitored computing activity, a peer of the child associated with the unusual behavior;
　a determination module, stored in memory, that determines, based at least in part on a comparison between the baseline behaviors and the unusual behavior, a level of influence the peer has on the child;
　a security module, stored in memory, that performs a computing security action that prevents the child from engaging in potentially harmful behaviors by providing, to a guardian of the child, the level of influence of the peer; and
　at least one physical processor configured to execute the monitoring module, the identification module, the determination module, and the security module.

13. The method of claim 12, wherein:
　the monitoring module monitors the computing activity on the endpoint device of the child by monitoring computing activity on multiple endpoint devices of the child; and
　the identification module identifies the peer of the child by analyzing concurrent computing activities detected on the multiple endpoint devices.

14. The system of claim 12, wherein the monitoring module monitors the computing activity on the endpoint device of the child by at least one of:
　monitoring online resources the child accesses via the endpoint device;
　monitoring communications distributed via the endpoint device; and
　monitoring geographic locations visited by the child based on a geolocation service of the endpoint device.

15. The system of claim 12, wherein the monitoring module identifies the baseline behaviors of the child by at least one of:
　identifying behaviors of the child that are associated with multiple peers; and
　recording computing activity detected on the endpoint device for a predetermined amount of time and identifying recurring behaviors of the child based on the recorded computing activity.

16. The system of claim 12, wherein the monitoring module identifies the unusual behavior of the child by detecting at least one of:
　a behavior associated with a particular peer rather than multiple peers;
　a novel behavior of the child not identified within the baseline behaviors; and
　a change in a frequency of a baseline behavior of the child.

17. The system of claim 12, wherein the identification module identifies the peer of the child associated with the unusual behavior by identifying an individual located within a same geographic location as the child while the child performs the unusual behavior.

18. The system of claim 12, wherein the identification module identifies the peer of the child associated with the unusual behavior by identifying an individual that is not located within a same geographic location as the child but that is in communication with the child while the child performs the unusual behavior.

19. The system of claim 12, wherein the determination module determines the level of influence the peer has on the child by quantifying a degree to which the unusual behavior deviates from the baseline behaviors of the child.

20. A non-transitory computer-readable medium comprising one or more computer-executable instructions that, when executed by at least one processor of a computing device, cause the computing device to:
　monitor activity on at least one endpoint device of a child to identify:
　　baseline behaviors that indicate expected behavior patterns of the child; and
　　an unusual behavior of the child that indicates a deviation from the baseline behaviors;
　identify, based at least in part on the monitored computing activity, a peer of the child associated with the unusual behavior;
　determine, based at least in part on a comparison between the baseline behaviors and the unusual behavior, a level of influence the peer has on the child; and
　perform a computing security action that prevents the child from engaging in potentially harmful behaviors by providing, to a guardian of the child, the level of influence of the peer.

\* \* \* \* \*

UNITED STATES PATENT AND TRADEMARK OFFICE
CERTIFICATE OF CORRECTION

PATENT NO. : 10,061,916 B1
APPLICATION NO. : 15/346754
DATED : August 28, 2018
INVENTOR(S) : Jiang et al.

Page 1 of 1

It is certified that error appears in the above-identified patent and that said Letters Patent is hereby corrected as shown below:

In the Claims

In Column 21, Line 39, in Claim 13, delete "The method" and insert -- The system --, therefor.

Signed and Sealed this
First Day of January, 2019

Andrei Iancu
*Director of the United States Patent and Trademark Office*